United States Patent [19]

Hayes

[11] Patent Number: 5,656,692

[45] Date of Patent: Aug. 12, 1997

[54] PROCESS FOR TRANSESTERIFICATION OF OLEFIN/ACRYLIC-ESTER COPOLYMERS

[75] Inventor: Richard Allen Hayes, Wilmington, Del.

[73] Assignee: E. I. Du Pont de Nemours and Company, Wilmington, Del.

[21] Appl. No.: 707,686

[22] Filed: Sep. 4, 1996

Related U.S. Application Data

[60] Provisional application No. 60/005,493, Oct. 16, 1995.

[51] Int. Cl.[6] ................................................ C08G 63/91
[52] U.S. Cl. .................... 525/63; 525/330.6; 528/392; 528/489; 528/495; 528/503
[58] Field of Search ............................ 525/63, 330.6; 528/392, 489, 495, 503

[56] References Cited

U.S. PATENT DOCUMENTS

| | | | |
|---|---|---|---|
| 3,418,395 | 12/1968 | Taniquchi et al. ................ | 525/194 |
| 5,021,506 | 6/1991 | Gastinger et al. ................ | 525/63 |
| 5,225,481 | 7/1993 | Gastinger et al. ................ | 525/63 |

FOREIGN PATENT DOCUMENTS

| | | |
|---|---|---|
| 37 15 027 A1 | 11/1988 | Germany . |
| WO90/10654 | 9/1990 | WIPO . |

OTHER PUBLICATIONS

G. Hu et al., Catalysis and reactivity of the transesterification of Ethylene and alkyl acrylate copolymers in solution and in the melt, *Polymer*, 35, 3082–3090, 1994.

*Primary Examiner*—Samuel A. Acquah

[57] ABSTRACT

Copolymers comprising olefin and alkyl-acrylate-ester repeat units are transesterified by olefin-containing alcohols in the presence of an alkali metal alkoxide catalyst. The transesterified polymers are especially useful as curable elastomers.

14 Claims, No Drawings

PROCESS FOR TRANSESTERIFICATION OF OLEFIN/ACRYLIC-ESTER COPOLYMERS

This application claims the priority benefit of U.S. Provisional Application 60/005,493, filed Oct. 16, 1995.

FIELD OF THE INVENTION

Disclosed herein is a process for the transesterification of a copolymer, which comprises olefin and alkyl acrylate ester, with an olefin-containing alcohol. In particular, the process employs a catalyst that is an alkali metal alkoxide.

TECHNICAL BACKGROUND

Olefin/alkyl-acrylate-ester copolymers, which may contain two or more different comonomers, are important items of commerce, being potentially useful as oil-resistant elastomers, hot melt adhesives, in-contact adhesives, and other products. Copolymers in which ethylene is the primary or sole olefin are commercially well known.

It is often desirable to readily crosslink (or cure) such polymers, particularly when these polymers are to be used as elastomers. For this reason, the polymer may include certain monomers (repeat units) which allow the polymer to be easily cured. These monomers, however, may sometimes make the polymerization more difficult. It would, therefore, be desirable to make olefin/acrylate-ester copolymers that are easily polymerized and that can be readily converted to copolymers that are easily cured.

The presence of allylic hydrogens (i.e., of the type C=C—C—H) in a polymer may indicate that the polymer is readily curable, for example, by sulfur or peroxides. The process described herein can produce polymers with such groupings by the at least partial transesterification of an olefin/alkyl-acrylate copolymer with an alkenyl alcohol in the presence of an alkali metal alkoxide catalyst. These catalysts are surprisingly active, allowing rapid reaction at relatively low temperatures. This results in relatively little degradation of the polymer during the process.

DE 37 15 027 A1 discloses the bulk transesterification of ethylene/alkyl acrylate ester copolymers with unsaturated fatty alcohols with an average of 12 to 20 carbon atoms and tricyclodecanol utilizing acid or tin catalysts in the temperature range of 20° to 230° C. for 5 to 8 hours.

U.S. Pat. No. 3,418,395 describes the transesterification of ethylene/acrylic-ester copolymers with alcohols containing tertiary amine groups. Various catalysts, including alkoxides, are mentioned. Alkoxides are not actually used in any of the examples.

PCT Patent Application 90/10654 describes the crosslinking of an ethylene/unsaturated-ester copolymer (acrylate-ester copolymers) by transesterification with a polyol, optionally in the presence of a catalyst. Only tin containing catalysts are used in the examples.

G. Hu et al., *Polymer*, vol. 35, p. 3082–3090 (1994) describe the transesterification of an ethylene/methyl-acrylate copolymer with 3-phenyl-1-propanol in the presence of various catalysts. Sodium methoxide is shown to be a poor catalyst with low activity.

SUMMARY OF THE INVENTION

This invention concerns a process for the transesterification of a copolymer, in particular, an olefin/alkyl-acrylate ester copolymer, which process comprises contacting the copolymer with an alkenyl alcohol in the presence of a catalytically effective amount of an alkali metal alkoxide, in the subtantial absence of a solvent, at a temperature of about 50° C. to about 300° C.

DETAILS OF THE INVENTION

The polymeric starting material for the process described herein is an olefin/acrylate-ester copolymer. This copolymer contains at least one repeat unit derived from an alkyl acrylate ester and at least one repeat unit derived from an olefin. In addition, this copolymer may optionally contain other repeat units, so long as those repeat units do not interfere with the transesterification. These optional repeat units suitably include, but are not limited to, methacrylate esters and amides, acrylate amides, styrene, acrylo-nitrile, vinyl chloride, diesters or diamides of maleic and fumaric acids, and the like.

Suitable olefins are those well known in the art that may be copolymerized with acrylate esters. Preferred olefins have the formula $H_2C=CH(CH_2)_mH$ wherein m is 0 or an integer from 1 to 20. Preferably, m is 0 (ethylene) or 1 (propylene).

The term "acrylate ester" or "alkyl acrylate ester," as used herein, has the usual meaning, namely, a compound of the formula $H_2C=CHCO_2R^1$ wherein $R^1$ is alkyl or substituted alkyl. In preferred esters (and the corresponding polymers), $R^1$ is an alkyl containing 1 to 8 carbon atoms, more preferably 1 to 4 carbon atoms, and most preferably $R^1$ is methyl.

The alkyl-acrylate-ester repeat unit may comprise 1 to 99 weight percent of the olefin/alkyl-acrylate-ester copolymer, and the olefin likewise may comprise 1 to 99 weight percent of this copolymer. If the only olefin in the polymer is ethylene, the alkyl-acrylate-ester repeat unit preferably comprises about 40 to about 80 weight percent of the copolymer.

By the term "alkenyl alcohol," as used herein, is meant an alcohol that contains at least one olefinic double bond. In addition, this alcohol may contain other functional groups which do not interfere with the transesterification reaction. Suitable alkenyl alcohols include allyl alcohol, crotyl alcohol, 3-methyl-2-buten-1-ol, 2-methyl-2-propen-1-ol, 3-methyl-3-buten-1-ol, 4-penten-1-ol, 6-methyl-5-hepten-2-ol, 1-octen-3-ol, β-citronellol, 10-undecen-1-ol, oleyl alcohol, nerolidol, 1,6-heptadien-4-ol, 2,4-dimethyl-2,6-heptadien-1-ol, nerol, geraniol, linalool, farnesol, menth-1-en-9-ol, retinol, myrtenol, nopol, oleyl alcohol, and unsaturated fatty alcohols. Primary alcohols are preferred. It is also preferred that the alkenyl alcohols contain about 4 to about 36 carbon atoms, more preferably about 4 to 18 carbon atoms.

The amount of alkenyl alcohol used in the process, in relationship to the amount of olefin/alkyl-acrylate-ester polymer, may vary. This may depend on the level of various properties desired in the final polymer. For instance, if it is desired to more notably change the physical properties of the olefin/alkyl-acrylate-ester polymer, then it may be desirable to transesterify a large proportion of the alkyl-acrylate-ester groups in the polymer.

In order to provide crosslinking sites, for example for sulfur-curing or peroxide-curing of the polymer, the absolute amount of alkenyl alcohol introduced into the polymer may not necessarily be very high. Also, it is not necessary that all of the alkenyl alcohol initially present in the process, or eventually added to the process, transesterify with the polymeric ester groups. Excess alkenyl alcohol may be removed at the end of the transesterification, if desired, particularly if it is volatile at the process temperature.

The catalyst for the process is an alkali metal alkoxide. By the term "alkali metal" is meant one or more of lithium, sodium, potassium, cesium or rubidium, which is present as a cation. Sodium and potassium are preferred alkali metals. By the term "alkoxide" is meant the anion of an alcohol. Suitable alkoxide anions include methoxide, ethoxide, propoxide, isopropoxide, t-butoxide, n-octoxide, and the like. Another useful alkoxide anion is the alkoxide of the alkenyl alcohol which is used in the transesterification. These alkoxides are made by methods well known in the art using commercially available materials. A catalytic amount of the alkali metal alkoxide, for use in the process, will typically range from about 0.01 to about 10 mole percent of the alkenyl alcohol used (originally present) in the process, more often about 0.1 to about 5 mole percent.

The instant process is carried out by mutually contacting all three essential ingredients, the olefin/alkyl-acrylate-ester copolymer, the alkenyl alcohol, and the alkali metal alkoxide catalyst. Although not absolutely necessary, the mixture is preferably stirred during the process, so as to provide intimate mixing and contact of the components. The reaction mixture may often be quite viscous due to the presence of the olefin/alkyl-acrylate-ester copolymer, so agitators capable of mixing such materials may be used. These include closed type kneaders such as Brabender® mixers or other mixers, including Atlantic Helicone® mixers, Haake® mixers, Banbury mixers, Farrell® mixers, Buss® co-kneaders, or single-screw or twin-screw extruders. The process may also be carried out in polymer transfer lines, preferably after being well mixed.

Since transesterification is usually an equilibrium reaction, some method is preferably provided to remove the "original" alcohol (the alcohol originally in the acrylate ester of the polymer) from the polymeric alkyl-acrylate-ester group. Such methods include fractional distillation or volatilization. It is, therefore, preferred that the by-product alcohol from the original alkyl-acrylate-ester group have a lower boiling point than the alkenyl alcohol used.

The temperature at which the process is carried out is not critical, about 50° C. to about 300° C. being suitable. A preferred temperature range is about 100° C. to about 250° C. The temperature may need to be elevated to some degree just to be able to mix the process ingredients, especially if the olefin/alkyl-acrylate-ester copolymer is a "solid" thermoplastic at ambient temperature. Generally speaking, the higher the temperature, the faster the transesterification reaction will take place.

The process is carried out in the substantial absence of solvent. By the phrase "substantial absence of solvent" is meant that less than 5 percent, by weight of the total process mixture, of any solvent is present during the process, more preferably less than 2% by weight. No solvent may be preferred. Not included within the definition of solvent are any of the essential process ingredients or by-products of the process, such as the alkenyl alcohol or alcohol from the original alkyl-acrylate-ester groups. Small amounts of solvent may be of some use in running the process. For instance, it may be more convenient to add small amounts of catalyst in suspension or solution with a small amount of solvent.

The polymers used in the Examples below were as follows:

Polymer "A" was a poly(ethylene-co-methyl acrylate) which incorporated 72 weight percent methyl acrylate. This material had a melt index of 40.

Polymer "B" was a poly(ethylene-co-methyl acrylate) which incorporated 62 weight percent methyl acrylate. This material had a melt index of 40.

EXAMPLES 1-5 AND COMPARATIVE EXAMPLES A-D

Polymer "A" (50.00 g, 0.4182 mol methyl acrylate content) was melted in a Brabender® mixer at the temperature noted below in Table 1 (±2° C.), under a constant nitrogen purge, for approximately 5 minutes. The Brabender® mixer used was a Brabender® Electronic Plasticorder model type EPL-V5502 equipped with a measuring head, type R.E.E.6, manufactured by C. W. Brabender Instruments, Inc. (South Hackensack, N.J.). The mixer was run at a speed between 70 and 75 rpm. A solution of 10-undecen-1-ol and the catalyst was added, as noted below in Table 1. The term "Ti(OBu)$_4$" denotes titanium(IV) butoxide, the term "SnEtH" denotes stannous 2-ethyl hexanoate, and the term "NaOMe" denotes sodium methoxide.

The sodium methoxide was added in the form of a 25 weight percent solution in methanol. Methanol is, by definition, not a solvent for poly(ethylene-co-methyl acrylate) polymer. A small sample was removed from the reactor 5 min after the alcohol/catalyst solution was added. The reaction was removed from the reactor 30 minutes after the alcohol/catalyst solution was added. All samples were quenched in a 0.10 weight percent aqueous acetic acid solution for 30 min at room temperature (20°±2° C.). The water solution was then poured off the polymer samples, and the polymer samples were dried in a vacuum oven at 8.5 kPa pressure, with a slight nitrogen purge, at room temperature overnight and at 80° C. for 4 h. The polymer samples were dissolved in perdeuterated toluene and subjected to proton NMR analysis on a G.E.(General Electric Co.) 300 MHz NMR spectrometer. The percent conversion was derived from the integration of the residual methyl ester (3.45 ppm) versus the new ester methylenes (4.10 ppm) and is reported in Table 1 below.

TABLE 1

| Ex. No. | Alcohol | Temp (°C.) | Amount (g) | Amount (mol %)[1] | Catalyst | Amount (g) | Amount (mol %)[2] | Times (min) | Conversion (%) |
|---|---|---|---|---|---|---|---|---|---|
| | 10-Undecen-1-ol | | | | | | | | |
| A | | 149 | 7.12 | 10.0 | None | 0.00 | 0.0 | 5.0 | 0 |
| | | | | | | | | 30.0 | 0 |
| B | | 149 | 7.12 | 10.0 | Ti(OBu)$_4$ | 0.36 | 2.5 | 5.0 | 0 |
| | | | | | | | | 30.0 | 0 |
| C | | 149 | 7.12 | 10.0 | SnEtH | 0.45 | 2.5 | 5.0 | 0 |
| | | | | | | | | 30.0 | 0 |
| 1 | | 150 | 7.12 | 10.0 | NaOMe | 0.06 | 2.5 | 5.0 | 53 |
| | | | | | | | | 30.0 | 58 |

TABLE 1-continued

| Ex. No. | Alcohol | Temp (°C.) | Amount (g) | Amount (mol %)[1] | Catalyst | Amount (g) | Amount (mol %)[2] | Times (min) | Conversion (%) |
|---|---|---|---|---|---|---|---|---|---|
| D | | 105 | 7.12 | 10.0 | NaOMe | 0.01 | 0.5 | 5.0 | 0 |
| | | | | | | | | 30.0 | 0 |
| 2 | | 105 | 7.12 | 10.0 | NaOMe | 0.02 | 1.0 | 5.0 | 11 |
| | | | | | | | | 30.0 | 11 |
| 3 | | 105 | 7.12 | 10.0 | NaOMe | 0.06 | 2.5 | 5.0 | 14 |
| | | | | | | | | 30.0 | 16 |
| 4 | | 101 | 7.12 | 10.0 | NaOMe | 0.11 | 5.0 | 5.0 | 14 |
| | | | | | | | | 30.0 | 16 |
| 5 | | 122 | 7.12 | 10.0 | NaOMe | 0.06 | 2.5 | 5.0 | 70 |
| | | | | | | | | 30.0 | 70 |
| 6 | | 180 | 7.12 | 10.0 | NaOMe | 0.01 | 0.56 | 5.0 | 34 |
| | | | | | | | | 10.0 | 41 |
| 7 | | 180 | 7.12 | 10.0 | NaOMe | 0.06 | 2.5 | 5.0 | 67 |
| | | | | | | | | 10.0 | 74 |
| 8 | | 209 | 7.12 | 10.0 | NaOMe | 0.06 | 2.5 | 5.0 | 77 |
| | 3-Methyl-2-butenol | | | | | | | 10.0 | 73 |
| 9 | | 132 | 7.20 | 20.0 | NaOMe | 0.06 | 1.2 | 5.0 | 15 |
| | | | | | | | | 30.0 | 27 |
| | 10-Undecen-1-ol | | | | | | | | |
| 10 | | 150 | 9.20 | 15.0 | NaOMe | 0.07 | 2.5 | 5.0 | 36 |
| | | | | | | | | 30.0 | 38 |

[1]Alcohol mol % based on the methyl acrylate content of the polymer used.
[2]Catalyst mol % based on the amount of alcohol used.

EXAMPLES 6–8

Polymer "A" (50.00 g, 0.4182 mol methyl acrylate content) was melted in the Brabender® mixer as described above at the temperature noted above in Table 1 (±2° C.) under a constant nitrogen purge for approximately 5 min. A solution of 10-undecen-1-ol and sodium methoxide, in the form of a 25 weight percent solution in methanol, as noted above in Table 1, was added in one portion to the viscous melt. A small sample was removed from the reactor 5 min after the alcohol solution had been added. The reaction was discontinued after a total of 10 min, and the reaction mixture removed from the reactor. The polymer samples were dissolved in perdeuterated toluene and subjected to proton NMR analysis on a G.E. Co. 300 MHz spectrometer. The percent conversion was derived from the integration of the residual methyl ester (3.45 ppm) versus the new ester methylenes (4.10 ppm) and is reported in Table 1 above.

EXAMPLE 9

Polymer "A" (50.00 g, 0.4182 mol methyl acrylate content) was melted in the Brabender® mixer (as described above) at the temperature noted above in Table 1 (±2° C.) under a constant nitrogen purge for approximately 5 min. A solution of 3-methyl-2-buten-1-ol and sodium methoxide, in the form of a 25 weight percent solution in methanol, as noted above in Table 1, was added in one portion to the viscous melt. A small sample was removed from the reactor 5 min after the alcohol solution had been added. The reaction was discontinued after 30 min, and the reaction mixture removed from the reactor. All samples were quenched in a 0.10 weight percent aqueous acetic acid solution for 30 min at room temperature (20°±2° C.). The water solution was then poured off the polymer samples, and the polymer samples were dried in a vacuum oven (at a pressure of 8.5 kPa), with a slight nitrogen purge at room temperature overnight and at 80° C. for 4 hours. The polymer samples were dissolved in perdeuterated toluene and subjected to proton NMR analysis as described above. The percent conversion was derived from the integration of the residual methyl ester (3.45 ppm) versus the new ester methylenes (4.63 ppm) and is reported above in Table 1.

EXAMPLE 10

Polymer "B" (50.00 g, 0.3601 mol methyl acrylate content) was melted in a Brabender® mixer as described above at the temperature noted above in Table 1 (±2° C.) under a constant nitrogen purge for approximately 5 min. A solution of 10-undecen-1-ol and sodium methoxide, in the form of a 25 weight percent solution, was added, as noted in Table 1 above. A small sample was removed from the reactor 5 min after the alcohol solution was added. The reaction was discontinued after 30 min, and the resulting reaction mixture was removed from the reactor. All samples were quenched in a 0.10 weight percent aqueous acetic acid solution for 30 min at room temperature (20°±2° C.). The water solution was then poured off the polymer samples, and the polymer samples were dried in a vacuum oven (pressure=8.5 kPa), with a slight nitrogen purge at room temperature overnight and at 80° C. for 4 h. The polymer samples were dissolved in perdeuterated toluene and subjected to proton NMR analysis, as described above. The percent conversion was derived from the integration of the residual methyl ester (3.45 ppm) versus the new ester methylenes (4.10 ppm) and is reported above in Table 1.

EXAMPLES 11–13

Polymer "A" (50.00 g, 0.4182 mol methyl acrylate content) was melted in an Atlantic Helicone® Mixer at the temperature noted below in Table 2 (±2° C.) under a constant nitrogen purge for approximately 5 min. The Atlantic Helicone® mixer was manufactured by Atlantic Research, a division of the Susquehanna Corporation, Mechanical Products Division, Alexandria, Va. A solution of cis-3,7-dimethyl-2,6-octadien-1-ol (Nerol) and sodium methoxide (in the form of a 25 weight percent solution in methanol) was added in one portion, as noted below in Table 2. A small sample was removed from the reactor 5 minutes after the addition of the alcohol solution. The reaction was discontinued after 30 min and the reaction mixture was removed from the reactor. All samples were quenched in a 0.10 weight percent aqueous acetic acid solution for 30 min at room temperature (20°±2° C.). The water solution was poured off the polymer samples and the polymer samples were dried in a vacuum oven (at a pressure of 8.5 kPa), with a slight nitrogen purge at room temperature overnight and at 80° C. for 4 h. The polymer samples were dissolved in perdeuterated toluene and subjected to proton NMR analysis on a G.E. 300 MHz NMR spectrometer. The percent conversion was derived from the integration of the residual methyl ester (3.45 ppm) versus the new ester methylenes (4.70 ppm) and is reported below in Table 2.

TABLE 2

| Example Number | Temp (°C.) | Alcohol (g) | Amount (mol %)[1] | Catalyst (g) | Amount (mol %)[2] | Time (min) | Conversion (%) |
| --- | --- | --- | --- | --- | --- | --- | --- |
| (Nerol) | | | | | | | |
| 11 | 153.5 | 6.45 | 10.0 | 0.06 | 2.5 | 5.0 | 59 |
| | | | | | | 30.0 | 61 |
| 12 | 153.0 | 12.90 | 20.0 | 0.11 | 2.5 | 5.0 | 68 |
| | | | | | | 30.0 | 68 |
| 13 | 153.5 | 6.45 | 10.0 | 0.11 | 5.0 | 5.0 | 73 |
| | | | | | | 30.0 | 67 |
| 14 | 141.0 | 10.50 | 7.2 | 0.18 | 5.0 | 5.0 | 42 |
| | | | | | | 10.0 | 62 |
| 15 | 151.0 | 11.44 | 7.2 | 0.10 | 2.5 | 5.0 | 44 |
| | | | | | | 10.0 | 61 |
| (10-Undecen-1-ol) | | | | | | | |
| 16 | 151.5 | 10.22 | 7.2 | 0.08 | 2.5 | 5.0 | 34 |
| | | | | | | 30.0 | 66 |
| 17 | 151.5 | 5.62 | 3.6 | 0.04 | 2.5 | 5.0 | 49 |
| | | | | | | 10.0 | 51 |
| 18 | 152.0 | 11.24 | 7.2 | 0.09 | 2.5 | 5.0 | 66 |
| | | | | | | 10.0 | 58 |
| 19 | 150.0 | 11.24 | 7.2 | 0.18 | 5.0 | 5.0 | 82 |
| | | | | | | 10.0 | 82 |
| 20 | 150.0 | 22.48 | 14.4 | 0.20 | 2.8 | 5.0 | 67 |
| | | | | | | 10.0 | 58 |
| 21 | 150.0 | 12.26 | 7.2 | 0.15 | 3.8 | 5.0 | 85 |
| | | | | | | 10.0 | 85 |
| 22 | 150.0 | 12.26 | 7.2 | 0.15 | 3.8 | 5.0 | 88 |
| | | | | | | 10.0 | 84 |
| 23 | 151.0 | 12.26 | 7.2 | 0.12 | 3.0 | 5.0 | 82 |
| | | | | | | 10.0 | 82 |
| 24 | 151.0 | 12.26 | 7.2 | 0.13 | 3.3 | 5.0 | 64 |
| | | | | | | 10.0 | 64 |
| | | | | | | 20.0 | 65 |

[1]Alcohol mol % based on the methyl acrylate content of the polymer used.
[2]Catalyst mol % based on the amount of alcohol used.

EXAMPLE 14

Polymer "A" (110.00 g, 0.9200 mol methyl acrylate content) was melted in the Atlantic Helicone® Mixer described above at the temperature noted above in Table 2 (±2° C.) under a constant nitrogen purge for approximately 5 min. A solution of cis-3,7-dimethyl-2,6-octadien-1-ol (Nerol) and sodium methoxide (in the form of a 25 weight percent solution in methanol) was added in one portion, as noted above in Table 2. A small sample was removed from the reactor 5 min after the addition of the alcohol solution. The reaction was discontinued after a total of 10 min, and the reaction mixture was removed from the reactor. The polymer samples were dissolved in perdeuterated toluene and subjected to proton NMR analysis on a G.E. 300 MHz spectrometer. The percent conversion was derived from the integration of the residual methyl ester (3.45 ppm) versus the new ester methylenes (4.70 ppm) and is reported above in Table 2.

EXAMPLE 15

Polymer "A" (120.00 g, 1.0036 mol methyl acrylate content) was melted in the Atlantic Helicone® Mixer described above at the temperature noted above in Table 2 (±2° C.) under a constant nitrogen purge for approximately 5 minutes. A solution of cis-3,7-dimethyl-2,6-octadien-1-ol (Nerol) and sodium methoxide (in the form of a 25 weight percent solution in methanol) was added in one portion, as noted above in Table 2. A small sample was removed from the reactor 5 minutes after the addition of the alcohol solution. The reaction was discontinued after a total of 10 minutes, and the reaction mixture was removed from the reactor. The polymer samples were dissolved in perdeuterated toluene and subjected to proton NMR analysis on a G.E. 300 MHz spectrometer. The percent conversion was derived from the integration of the residual methyl ester (3.45 ppm) versus the new ester methylene (4.70 ppm) and is reported above in Table 2.

EXAMPLE 16

Polymer "A" (100.00 g, 0.8363 mol methyl acrylate content) was melted in the above described Atlantic Helicone® mixer at the temperature noted above in Table 2 (±2° C.) under a constant nitrogen purge for approximately 5 min. A solution of 10-undecen-1-ol and sodium methoxide (in the form of a 25 weight percent solution in methanol) was added in one portion, as noted above in Table 2. A small sample was removed from the reactor 5 min after the addition of the alcohol solution. After mixing at the temperature noted for 30 min, acetic acid (0.10 gram) was added, and the resulting reaction mixture was allowed to stir for an additional 5 min at the temperature noted above in Table 2. The reaction mixture was then discharged from the reactor. The polymer samples were dissolved in perdeuterated toluene and subjected to proton NMR analysis on a G.E. 300 MHz NMR spectrometer. The percent conversion reported above in Table 2 was derived from the integration of the residual methyl ester (3.45 ppm) versus the new ester methylene (4.10 ppm).

EXAMPLES 17–20

Polymer "A" (110.00 g, 0.9200 mol methyl acrylate content) was melted in the above described Atlantic Helicone® Mixer at the temperature noted above in Table 2 (±2° C.) under a constant nitrogen purge for approximately 5 min. A solution of 10-undecen-1-ol and sodium methoxide (in the form of a 25 weight percent solution in methanol) was added in one portion, as noted above in Table 2. A small sample was removed from the reactor 5 min after the addition of the alcohol solution. After mixing at the temperature noted for a total of 10 min, the reaction was discontinued and the reaction mixture removed from the reactor. The polymer samples were dissolved in perdeuterated toluene and subjected to proton NMR analysis on a G.E. spectrometer. The percent conversion reported above in Table 2 was derived from the integration of the residual methyl ester (3.45 ppm) versus the new ester methylene (4.10 ppm).

EXAMPLES 21–23

Polymer "A" (120.00 g, 1.0036 mol methyl acrylate content) was melted in the Atlantic Helicone® Mixer described above at the temperature noted above in Table 2 (±2° C.) under a constant nitrogen purge for approximately 5 min. A solution of 10-undecen-1-ol and sodium methoxide (in the form of a 25 weight percent solution in methanol) was added in one portion, as noted above in Table 2. A small sample was removed from the reactor 5 min after the addition of the alcohol solution. The reaction was discontinued after a total of 10 min, and the reaction mixture was removed from the reactor. The polymer samples were dissolved in deuterated chloroform and subjected to proton NMR analysis on a G.E. 300 MHz spectrometer. The percent conversion was derived from the integration of the residual methyl ester (3.76 ppm) versus the new ester methylene (4.10 ppm) and is reported above in Table 2.

EXAMPLE 24

Polymer "A" (120.00 g, 1.0036 mol methyl acrylate content) was melted in the Atlantic Helicone® Mixer described above at the temperature noted above in Table 2 (±2° C.) under a constant nitrogen purge for approximately 5 min. A solution of 10-undecen-1-ol and sodium methoxide (in the form of a 25 weight percent solution in methanol) was added in one portion, as noted above in Table 2. A small sample was removed from the reactor 5 min after the addition of the alcohol solution. Another small sample was removed from the reactor 10 min after the addition of the alcohol solution. Acetic acid (0.14 g) was added to the reactor 15 min after the addition of the alcohol solution. The reaction was discontinued after a total of 20 min after the addition of the alcohol solution addition, and the reaction mixture was removed from the reactor. The polymer sample were dissolved in deuterated chloroform and subjected to proton NMR analysis on a G.E. 300 MHz spectrometer. The percent conversion was derived from the integration of the residual methyl ester (3.65 ppm) versus the new ester methylene (4.10 ppm) and is reported above in Table 2.

What is claimed is:

1. A process for at least partial transesterification of a copolymer having repeat units comprising olefin and alkyl-acrylate-ester, which process comprises reacting the copolymer with an alkenyl alcohol in the presence of a catalytically effective amount of an alkali metal alkoxide, at a temperature of about 50° C. to about 300° C. and in the substantial absence of solvent.

2. The process as recited in claim 1 wherein said olefin is ethylene or propylene.

3. The process as recited in claim 1 wherein said alkyl acrylate ester is an ester of a second alcohol containing 1 to 8 carbon atoms.

4. The process as recited in claim 3 wherein said second alcohol is methanol.

5. The process as recited in claim 2 wherein said aklyl acrylate ester comprises about 40 to about 80 weight percent of said copolymer.

6. The process as recited in claim 1 wherein said alkenyl alcohol has about 4 to about 11 carbon atoms.

7. The process as recited in claim 1 wherein said temperature is about 100° C. to about 250° C.

8. The process as recited in claim 1 wherein said alkali metal is sodium or potassium.

9. The process as recited in claim 1 wherein said alkali metal alkoxide is about 0.01 to about 10 mole percent of said alkenyl alcohol present.

10. The process as recited in claim 1 wherein said alkali metal alkoxide is about 0.1 to about 5 mole percent of the alkenyl alcohol present.

11. The process as recited in claim 1 wherein no more than 2 weight percent of solvent is present.

12. The process as recited in claim 2 wherein said alkenyl alcohol has about 4 to about 11 carbon atoms, said temperature is about 100° C. to about 250° C., said olefin is ethylene, said alkali metal is sodium or potassium, and said alkali metal alkoxide is about 0.1 to about 5 mole percent relative to the amount of said alkenyl alcohol.

13. The process as recited in claim 1 wherein said alkenyl alcohol has one carbon-carbon olefinic bond.

14. The process as recited in claim 1 wherein said copolymer comprises at least one repeat unit other than, and in addition to, said olefin and alkyl-acrylate-ester repeat units.

* * * * *